United States Patent

[11] 3,550,764

| [72] | Inventor | Ruben A. Tigner<br>Bay City, Mich. |
|---|---|---|
| [21] | Appl. No. | 742,700 |
| [22] | Filed | July 5, 1968 |
| [45] | Patented | Dec. 29, 1970 |
| [73] | Assignee | The Dow Chemical Company<br>Midland, Mich.<br>a corporation of Delaware |

[54] OPENING DEVICE
12 Claims, 4 Drawing Figs.

[52] U.S. Cl..................................................... 206/46,
99/171, 229/51, 229/66
[51] Int. Cl..................................................... B65d 75/58,
B65d 77/30, B65d 85/72
[50] Field of Search............................................206/46(M),
46(Food), 56(A2); 229/51(IS), 51(AS), 51(BP),
66, 85, 86, 55; 220/54; 99/171

[56] References Cited
UNITED STATES PATENTS

| 2,923,456 | 2/1960 | Ryan............................. | 229/55 |
| 3,001,644 | 9/1961 | Fourness et al.............. | 229/51(IS) |
| 3,131,069 | 4/1964 | Goller et al................. | 206/46(Food) |
| 3,368,740 | 2/1968 | Rohde.......................... | 229/51(IS) |
| 3,387,736 | 6/1968 | Williamson................... | 229/51(IS) |

*Primary Examiner*—William T. Dixson, Jr.
*Attorneys*—Griswold & Burdick, Richard G. Waterman and Burke M. Halldorson

ABSTRACT: A tear opening device comprising a thickened bead integrally formed in a web of synthetic resinous thermoplastic film. The bead is formed of a crystalline thermoplastic as, for example, polyvinylidene chloride. Beads formed of such materials exhibit desirable qualities of hardness, high tensile strengths, and relatively low extensibility. Film laminates are effectively torn open by strategically arranging the different plies of the laminate according to the physical properties of each ply, and by forming the bead in a ply composed of a highly crystalline material.

PATENTED DEC 29 1970  3,550,764

INVENTOR.
Ruben A. Tigner
BY
Burke N. Halldorson
ATTORNEY

OPENING DEVICE

DESCRIPTION OF THE INVENTION

In U.S. Pat. No. 3,282,672 it is disclosed that an opening device can be obtained by laying a bead of hot melt on a synthetic resinous thermoplastic web. In bags formed from such webs, the bead is disposed on the outer surface of the bag.

While this general concept is of a particular interest as concerns an opening device for application to flexible packages, as, for example, thermoplastic bags, the effectiveness of such an opening device has heretofore, generally been less than would be desired.

The reasons for this can be generally summarized as: (1) Such an opening device as taught in the prior art frequently does not achieve a preferential line of tear, that is, when the opening device is activated, the tear can proceed in practically any direction; (2) The conventional flexible packaging materials as, for example, the low density polyethylene films and the heavy plasticized polyvinyl chloride films, are frequently of a tough, highly stretchable, rubberylike quality. Controlled tearing of such film materials is difficult to achieve; (3) The location of the bead is most commonly, if not always, on the outer surface of the package. With multilayered films as, for example, those formed by coextrusion techniques, such an arrangement is frequently unsatisfactory in that it will not give a clean tear through the multilayered film; and (4) Obtaining sufficient adhesion between the bead and the film is a particularly delicate fabrication step. Frequently, the bead has a tendency to strip off the package leaving the film therebelow relatively undisturbed.

Accordingly, it is an object of the present invention to provide an improved opening device for flexible packages, as for example, those formed of thermoplastic film wherein the opening device can be integrally formed with the film and need not be applied by a separate fabricating step.

It is a further object of the present invention to provide such an opening device wherein the device is so arranged that its activation will cause a preferential direction of tearing to result, thereby providing for a relatively controlled tear opening of the package.

It is still a further object of the present invention to provide such an opening device wherein the opening device comprises a bead of crystalline thermoplastic resinous material integrally formed in the film portion of the package and extending along the axis of major molecular orientation of the film.

It is still another object of the present invention to provide a package including such an opening device wherein the material comprising the opening device has a glass transition temperature greater than the temperature at which the package is normally stored.

It is another object of the present invention to provide such an opening device which is so constructed and arranged that its use is effective even on those packages comprised of the tough, highly stretchable thermoplastic materials as, for example, the low density polyethylenes or the highly plasticized polyvinyl chlorides.

It is yet another object of the present invention to provide such an opening device wherein a molecular orientation of the bead along its longitudinal axis is effected whereby beads of superior tensile strengths can be provided.

Briefly then, the present invention contemplates an improved opening device for flexible packaging applications wherein the opening device generally comprises a bead integrally formed in synthetic resinous thermoplastic film or sheet material. The bead is made integral with the film as, for example, by forming a bead profile in the film as it is being extruded. A preferential direction of tearing is obtained by locating the bead along the axis of the major molecular orientation of the film, as is described hereinafter in more detail. The bead is formed of highly crystalline thermoplastic resin as, for example, polyvinylidene chloride or a copolymer of vinylidene chloride and vinyl chloride. Such materials exhibit desirable physical characteristics of hardness, high tensile strengths, especially when orientated, and relatively low extensibility qualities. The net effect of these qualities is a higher degree of controlled tearing when ripping the package open by means of the bead opening device. In multi-ply films or laminates including plies of the tough rubberylike packaging materials, the rubbery plies are sandwiched between plies of crystalline material having the qualities described above, or in the case of a two ply laminate, the rubbery ply forms the outer skin of the package. In either case the bead is formed in one of the crystalline plies.

Yet additional objects and advantages of the present invention, and its numerous and cognate benefits, are even more apparent and manifest in and by the ensuing description and specification taken in conjunction with the accompanying drawing, in which wheresoever possible, like characters of reference designate corresponding material and parts throughout the several views thereof in which.

Figure 1:
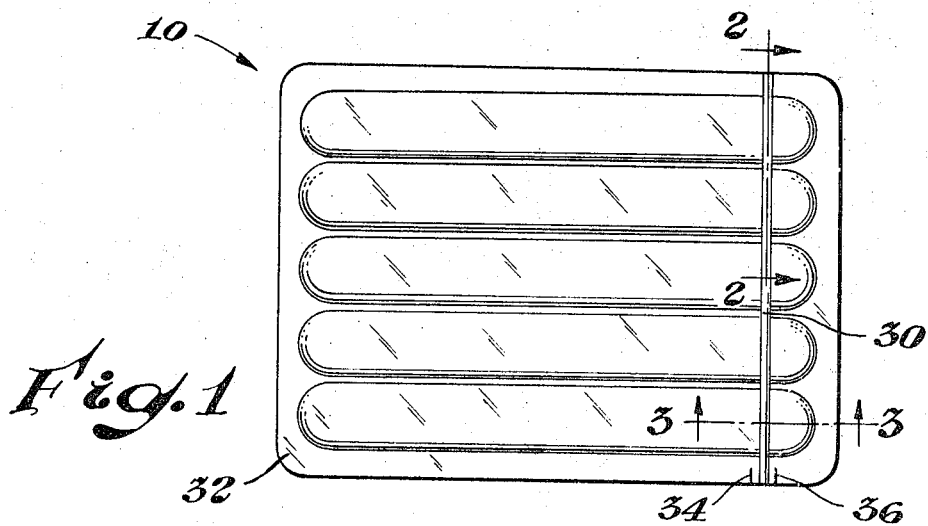
FIG. 1 is a top view of a package including a convenient opening device constructed according to the principles of the present invention.
Figure 2:
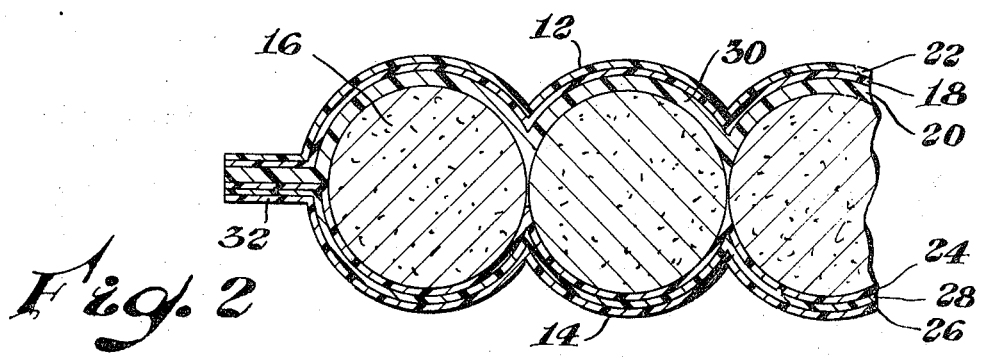
FIG. 2 is a partial and enlarged cross-sectional view of the package of FIG. 1 taken along reference line 2—2 thereon.

Referring now more particularly to the drawings, there is shown in FIGS. 1 through 4 a wiener-type package 10 which is formed by combining upper and lower layers of multi-ply or laminated films. Specifically, package 10 includes a top laminate 12 and bottom laminate 14 which cooperatively enclose therebetween a plurality of wieners or wiener-type products 16, these products being placed in a side-by-side relationship. More specifically, the laminates 12 and 14 each comprise a composite structure of three plies of a synthetic resinous thermoplastic material. Accordingly, the top laminate 12 includes inner and outer plies 20 and 22, respectively, which sandwich between them in intimately joined relationship, a middle or intermediate ply 18. Laminate 14 is likewise constructed having inner and outer plies 24 and 26, respectively, sandwiching an intermediate ply 28. To form package 10, the laminates 12 and 14 are softened by heat and then drawn, as for example by vacuum pressures, inwardly about the products 16 to conform to the general contour thereof. A closure is then effected by joining together the laminates 12 and 14 peripherally about products 16 to form a continuous edge seal 32. Seal 32 can be formed by applications of pressure and/or heat, or by suitable solvents, adhesives or the like as would be appropriate for the materials involved.

Figure 3:
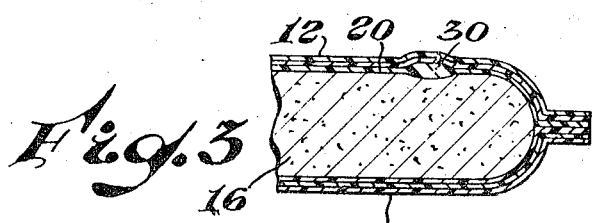
FIG. 3 is a partial and enlarged cross-sectional view of the package of FIG. 1 taken along reference line 3—3 thereon.

The opening device provided for package 10 generally includes a thickened profile or bead 30 which can be located either in the top or bottom laminate 12 or 14, and for purposes of description is shown as integrally formed in the inner ply 20 of the top laminate 12, as is best illustrated in FIG. 3. Suitable tearing results can usually be obtained with a bead thickness of from about 2 to about 10 times the combined thickness of the plies (plies 18 and 22) of laminate 12 not including the thickness of the ply (ply 20) in which the bead is formed. Cuts 34 and 36 are made in seal 32 on each side of bead 30 to allow the bead to be conveniently gripped for purposes of ripping package 10 open. For advantages that will be explained more fully hereinafter, the bead extends across the minor dimension of the package, that is, the shortest side to side or transverse dimension thereof.

The material comprising the inner ply 20 and consequently the bead 30 formed therein can be selected from those materials highly crystalline in structure. A material having such crystalline structure and one which is particularly beneficial to the practice of the present invention is a vinylidene chloride polymer. Another such advantageous material is a copolymer of vinylidene chloride and vinyl chloride wherein the vinylidene chloride comprises at least 50 percent by weight of the copolymer. For optimum results the vinylidene chloride component is in the range of at least 70 percent or better. Polyvinylidene chloride, and the aforementioned copolymer at 70 percent or better concentrations of the vinylidene chloride, exhibit remarkable crystalline structure. The properties that are of utmost concern in such materials is their hardness, and relatively low extensibility qualities, such that when a bead as, for example, the bead shown in FIG. 3, is integrally formed in this material, it is such as to promote a controlled tearing action through the laminate 12, with the end product being a more controlled tear opening of package 10 than could otherwise be obtained.

Figure 4:
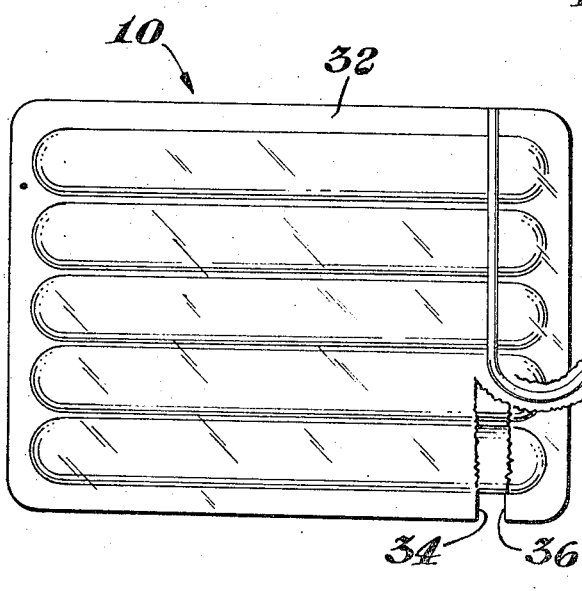
FIG. 4 is a view like FIG. 1 only showing the opening device partially activated.

By using a crystalline material to form at least the inner ply 20 of the top laminate 12, the more tough, highly stretchable rubberylike packaging materials such as the low density polyethylenes or the highly plasticized polyvinylidene chlorides, can be employed as the other layers or plies forming laminate 12. Particularly beneficial in such a package construction, is a top laminate 12 wherein the rubberylike ply forms the intermediate ply 18, and is sandwiched between inner and outer plies 20 and 22 of relatively highly crystalline material of the quality as described above. It has been found that the crystalline plies in such constructions seem to influence the tearing characteristics of the more rubbery packaging materials, such that when the opening device is activated, as shown in FIG. 4, a relatively controlled tear opening of the top laminate 12 occurs.

The purpose of forming the bead across the minor transverse direction of package 10 is to facilitate a preferential direction of tearing when activating the opening device. Sine Since these packages, like package 10, are commonly formed by vacuum drawing the laminates 12 and 14 into suitable molds, a certain amount of stretching of the laminate occurs during the drawing process whereby it has become established, that the crystalline structure of these materials becomes orientated in one or more directions. Generally the major directional orientation is along the line of maximum stretching. Maximum stretching normally occurs across the smallest transverse dimension of the package. Along this line, then, there is formed the major axis of molecular orientation of the laminate 12. Tearing crosswise to this orientation has been for found to be difficult and for opening devices of the general type described above, results are generally far less satisfactory than when the opening device is located parallel to this axis. Of course, this preferential line of tearing is unlike those conceptionally familiar to the prior art wherein generally a weakening of the film by grooves, serrations or the like is caused to form a preferential line of tear. While no weakening or thinning of the material is shown in the present invention, although such may be practiced in combination with the teachings herein, a preferential direction tearing does actually exist and operates as described above even though the means causing such preferential tearing are not visible to the eye.

The multilayered laminates 12 and 14 illustrated above can be manufactured by coextrusion techniques like that illustrated in some detail in British Pat. No. 915,310 and Italian Pat. No. 522,838. To form the bead 30, a notch can be cut in the lips of the extruder die forming the inner layer 20, or that layer in which the bead is to be located, such that the layer is extruded with a thickened section or bead 30.

Since the different materials forming the laminates 12 and 14 are frequently relatively noncompatible, that is, they do not readily fuse or weld together, the bond between them or between the layers of the laminate is frequently formed by compressing the layers tightly together between rubber rolls. The bead 30 as described in the present invention is shown as located on the inner layer 20 whereby by pulling on the bead outwardly, a tearing through the multiple layers of such laminate structures is possible.

Exemplary of other crystalline materials suitable for practice in accordance with the principles of the present invention are polypropylene, polyacrylonitrile, polyethylene teraphthalate, isotatic polystyrene, high density polyethylene (high density polyethylene is of greater crystalline structure than low density polyethylene and exhibits the degrees of hardness and low extensibility desired for bead 30), poly 4 methol 1 pentene, ethylene butene copolymers, for example such a copolymer wherein a butene component measures 5 percent by weight of the copolymer.

Other materials which may or may not exhibit a crystalline structure, but which are suitable for forming bead 30 include those synthetic resinous thermoplastics having a glass transition temperature greater than the temperature at which the package having such an opening device is normally stored. In temperature environments below their glass transition temperature, such materials possess the levels of hardness and low stretchability or extensibility qualities desired of bead 30. Storage of frozen food packages is generally conducted in a temperature range of from about $-40°$ C. to about $-20°$ C. For wieners and like meat packages, storage in a housewife's refrigerated unit at temperatures of from about $2°$ to about $10°$ C. is the norm. Other packages, such as those containing peanuts and candies, are usually stored at room temperature.

Accordingly, a bead material suitable for the usual frozen food packages could be a synthetic resinous thermoplastic having a glass transition temperature of greater than $-20°$ C. or if storage is at $-40°$ C, greater than $-40°$ C. Like criteria can be used for selection of suitable bead material for the other general packaging categories, that is, the category of the package as defined by the temperature environment at which it is normally stored. Usually a number of selections will be available for each category with the optimum choice of a particular material frequently residing in other desired attributes, as for example, clarity, sealing characteristics, cost, and the like. A table listing the glass transition temperatures of a number of polymer materials can be found in the "Polamer Handbook," by J. Brandings and E. H. Immergut, and published by Interscience Publishers, copyrighted 1966.

A beneficial method of forming package 10, and one which takes advantage of the unique super cooled qualities of polyvinylindene chloride an vinylidene chloride/vinyl chloride copolymers is illustrated in detail in U.S. Pat. Nos. 3,083,106 and 3,131,069.

While certain representative embodiments and details have been shown for the purpose of illustrating the invention, it will be apparent to those skilled in the art that various changes and modifications can be made therein without departing from the spirit and scope of the invention.

I claim:

1. A tear opening device for a package having a portion thereof comprised of synthetic resinous thermoplastic film, said opening device comprising a profile formed in said film by thickening a portion of the film, and tab means cooperative with said opening device for grasping the same and applying a pulling force to the opening device to tear open the package.

2. The opening device of claim 1 wherein said thickened profile comprises a crystalline thermoplastic material having characteristics of hardness, tensile strength, and elasticity similar to that of vinylidene chloride polymer.

3. The opening device of claim 2 wherein said film portion is a laminate including a ply of crystalline material, said ply comprising the inner surface of said film portion, said thickened profile being integrally formed in said crystalline ply.

4. The opening device of claim 3 wherein said laminate includes a ply of material having rubberylike characteristics similar to that of low density polyethylene.

5. The opening device of claim 4 wherein said laminate comprises crystalline plies sandwiching an intermediate ply composed of said stretchable material.

6. The opening device of claim 5 wherein said thickened profile extends in a direction parallel to the direction of the major molecular orientation of said film.

7. The opening device of claim 1 wherein said film portion is stretched when forming said package said profile extending generally parallel to the direction of maximum stretching of said film portion.

8. The opening device of claim 1 wherein said package is a frozen food package, and wherein the material forming said thickened profile comprises a synthetic resinous thermoplastic, said thermoplastic having a glass transition temperature greater than the temperature environment in which said package is normally stored.

9. The opening device of claim 8 wherein said glass transition temperature is greater than about −40° C.

10. The opening device of claim 9 wherein said glass transition temperature is greater than about 10° C.

11. The opening device of claim 1 wherein said package is normally stored at room temperature, said thermoplastic having a glass transition temperature greater than the usual room temperature environment in which said package is stored.

12. The opening device of claim 3 wherein said film portion is a laminate, one of the plies of said laminate having said thickened profile integrally formed therein, the thickness of said profile being from about 2 to about 10 times as thick as the combined thickness of the plies comprising said laminate not including the ply in which said profile is formed.